United States Patent [19]

Andersen

[11] Patent Number: 4,522,770

[45] Date of Patent: Jun. 11, 1985

[54] METHOD FOR RESTORING DENTED AREAS IN BOTTLE NECK FINISH

[75] Inventor: Jorn W. Andersen, Nashua, N.H.

[73] Assignee: The Continental Group, Inc., Stamford, Conn.

[21] Appl. No.: 357,350

[22] Filed: Mar. 11, 1982

[51] Int. Cl.³ .............................................. B29C 17/00
[52] U.S. Cl. .................................... 264/36; 264/521; 264/230; 425/11; 425/445
[58] Field of Search ................... 264/25, 36, 521, 230, 264/234, 235, 345, 346; 425/445, 11

[56] References Cited

U.S. PATENT DOCUMENTS

| | | | |
|---|---|---|---|
| 4,035,462 | 7/1977 | Lane, Jr. .......................... | 264/230 X |
| 4,260,567 | 4/1981 | Poppe et al. ..................... | 264/235 X |
| 4,375,442 | 3/1983 | Ota et al. ......................... | 264/521 X |
| 4,379,099 | 4/1983 | Ota et al. ......................... | 264/521 X |

FOREIGN PATENT DOCUMENTS

| | | | |
|---|---|---|---|
| 46-35160 | 10/1971 | Japan ................................... | 264/230 |
| 51-89577 | 8/1976 | Japan ................................... | 264/230 |

*Primary Examiner*—Jan Silbaugh
*Attorney, Agent, or Firm*—Charles E. Brown

[57] ABSTRACT

This relates to the removal of indentations in the sealing surfaces of plastic bottles, particularly blow molded bottles. The neck finish of each bottle, as it moves along a discharge conveyor from a blow molding machine, is heated to a temperature approaching the glass transition temperature of the plastic material, at which temperature the memory of the plastic material begins to induce slight flow and wherein the indentations are eliminated by the flow of the plastic material of the sealing surface.

7 Claims, 1 Drawing Figure

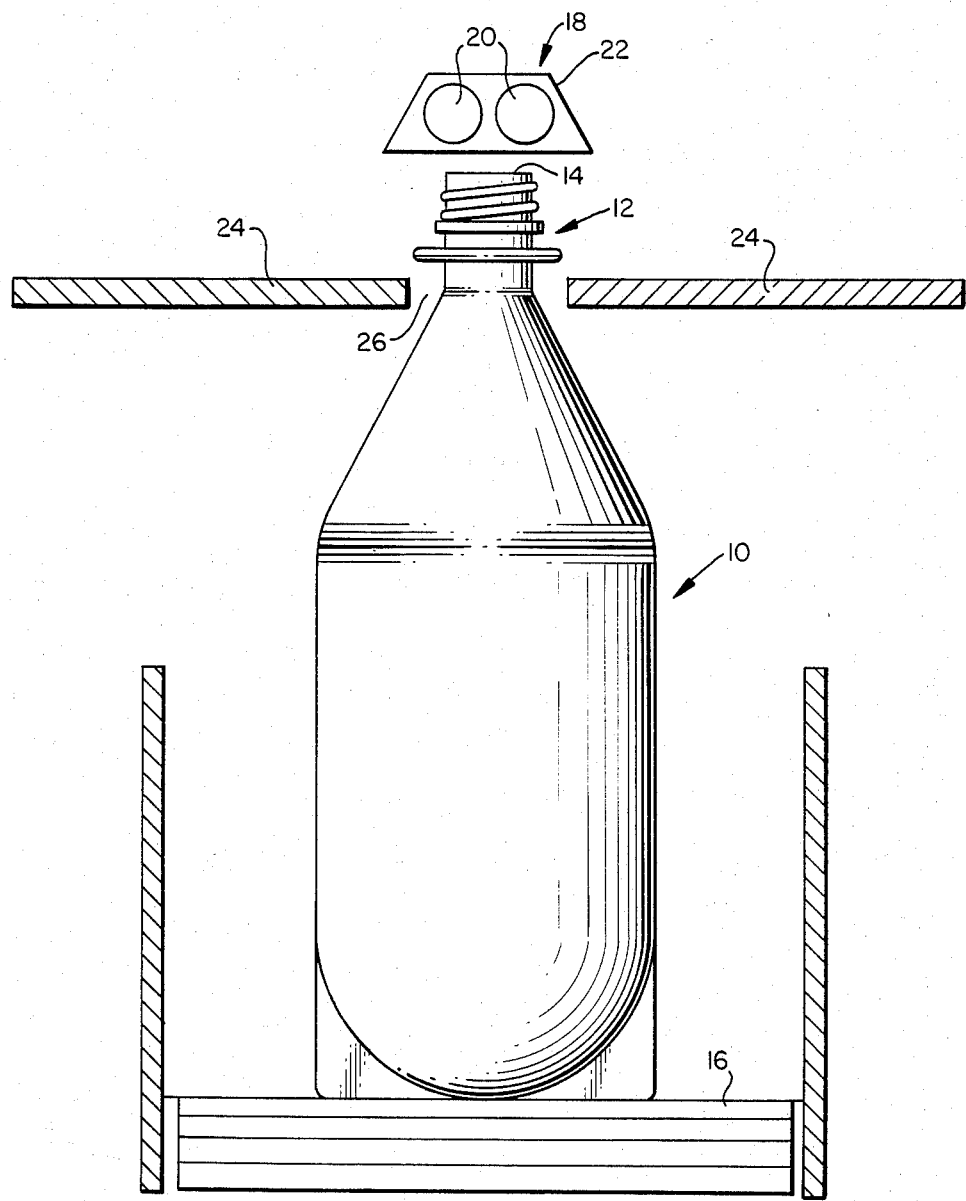

METHOD FOR RESTORING DENTED AREAS IN BOTTLE NECK FINISH

This invention relates in general to new and useful improvements in the blow molding of bottles of polyester material, particularly polyethylene terephthalate, and most particularly relates to the restoring of sealing surfaces of the neck finish which may be slightly damaged during the production of such bottles.

In the normal formation of a blown polyester bottle, a preform having the required neck finish is injection molded and then, in a separate operation, the preform is blow molded to form a bottle without there being any change in shape of the neck finish. In the preform handling and bottle forming operation, from time to time small nicks and dents occur in the sealing surface of the neck finish which may possibly prevent a proper seal between a closure cap and a neck finish when the product is packaged within the bottle. In accordance with this invention, such indentations in the sealing surfaces are eliminated by heating the sealing surfaces to a temperature up to the glass transition temperature T/C. At this temperature the indentations will be eliminated due to the memory flow of the plastic material.

In accordance with this invention, when the bottle exits from the blow molding machine it passes along a conveyor. It is proposed to provide in overlying relation to the conveyor a heater which will be positioned closely above the neck finish of bottles passing along the conveyor so as automatically to heat each and every bottle to the memory flow temperature of the plastic material.

It is also proposed to eliminate the effect of the heater on other portions of the bottles by providing cooling plates between which the bottles pass, thereby shielding the remainder of the bottles from the heater.

Although the invention is preferably utilized in conjunction with the finished bottle, it is to be understood that like indentations in the sealing surfaces of the neck finish of the preforms may also be removed using the same process.

With the above and other objects in view that will hereinafter appear, the nature of the invention will be more clearly understood by reference to the following detailed description, the appended claims, and the accompanying drawing.

IN THE DRAWING

The drawing is a sectional view through a blow molding machine discharge conveyor, and shows the heating and cooling means of the invention.

Referring now to the drawing in detail, it will be seen that there is illustrated a typical bottle identified by the numeral 10. The bottle 10 has been formed by blow molding from a preform (not shown) in a conventional manner. The bottle 10 is provided with a neck finish 12 which includes a sealing surface 14 at the upper end thereof intended for sealing engagement with a closure cap so as to maintain a product, such as a carbonated beverage, within the bottle under pressure.

It is to be understood that the preform from which the bottle 10 is formed may initially be formed with the neck finish 12 by an injection molding process.

During the handling of the preform and the bottle forming operation, at times the sealing surface 14 becomes nicked or indented so as to be interrupted. The extent of the indentations may be one which would preclude forming a seal with the closure cap. Accordingly, when detected under ordinary circumstances the bottle would have to be discarded. Further, and most particularly, although the bottles are inspected, such indentations may be occasionally missed by the inspector with the result that defective bottles enter the market place.

In accordance with this invention, it is proposed to reform the sealing surface 14 of each and every bottle in an automatic manner so as to make certain as to the elimination of such indentations in the sealing surfaces. The bottles 10 are customarily removed from the blow molding machine by means of an outlet conveyor 16 which conveys the newly blown bottles along a straightline path. There is provided in overlying relation to the conveyor 16 an electric heater generally identified by the numeral 18. The heater 18 is centered relative to the path of the sealing surface 14 and is disposed slightly above the path of the sealing surface 14. The electric heater 18 may be of any construction, but is illustrated as including two heating elements 20 which may be of the Calrod type and which are mounted within a hood 22 which may have mirrored internal surfaces and function as a reflector.

It is desired to concentrate the heat on the neck finish 12 and most particularly the sealing surface 14 without any disturbance whatsoever to the remainder of the bottle. Accordingly, there is associated with the heater 18 a pair of cooling plates 24 which lie in the same plane slightly below the path of the neck finish 12. The cooling plates 24 are separated to define a gap 26 through which the neck or neck finish of the bottle 10 passes without interference.

It will be readily apparent from the drawing that the relationship of the heater 18 and the cooling plates 24 is such that substantially all of the heat from the electric heater 18 which is directed onto the bottles 10 is directed onto the neck finish 12 and primarily upon the sealing surface 14.

The sealing surface 14 is heated to a temperature wherein there will be flow of the plastic material of the neck finish due to memory, with the temperature of the heated sealing surfaces approaching the glass transition temperature T/C. For the polyesters which are utilized in the blow molding of bottles, particularly beverage bottles, this temperature will range between 212° and 280° F.

Although the indentation removal operation is primarily intended to be utilized in conjunction with blown bottles and is not restricted to bottles formed from injection molded preforms, when injection molded preforms are utilized, it is also feasible to heat the sealing surface 14 of each such preform to the memory temperature of the plastic material whereby the indentation may be removed from the sealing surface of the preform prior to the bottle blowing operation.

Although only a preferred embodiment of the invention has been specifically illustrated and described herein, it is to be understood that minor variations may be made in the manner in which the sealing surfaces are heated to the desired memory temperature of the plastic material without departing from the spirit and scope of the invention as defined by the appended claims.

I claim:

1. A method of removing an indented imperfection from a neck finish sealing surface of a bottle formed of a polyester, said method comprising the steps of heating the neck finish to an elevated temperature up to the glass transition temperature of the polyester and then permitting the sealing surface to reform removing the imperfection due to the memory of the polyester.

2. A method according to claim 1 together with the step of shielding the remainder of the bottle during the heating of the neck finish.

3. A method according to claim 2 wherein the bottle is being conveyed during the heating of the neck finish, and the shielding is effected by passing a neck portion of the bottle between a pair of cooling plates.

4. A method according to claim 1 wherein the bottle is still in the preform stage.

5. A method according to claim 1 wherein the bottle is a blow molded bottle, and the heating of the neck finish occurs as the bottle passes from an associated blow molding machine.

6. A method according to claim 5 wherein the bottle is being conveyed from the blow molding machine and heating of the neck finish is effected by passing the neck finish under a fixed heater.

7. A method according to claim 1 wherein said temperature ranges between 212° and 280° F.

* * * * *